US010525935B2

(12) United States Patent
Tomita et al.

(10) Patent No.: US 10,525,935 B2
(45) Date of Patent: Jan. 7, 2020

(54) DOOR CONTROL SYSTEM, CONTROL DEVICE, AND MOBILE DEVICE

(71) Applicants: Yosuke Tomita, Aichi (JP); Yosuke Kajima, Aichi (JP); Hirofumi Ohata, Aichi (JP); Koichi Eguchi, Gifu (JP); Yuki Tokuyama, Aichi (JP)

(72) Inventors: Yosuke Tomita, Aichi (JP); Yosuke Kajima, Aichi (JP); Hirofumi Ohata, Aichi (JP); Koichi Eguchi, Gifu (JP); Yuki Tokuyama, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 256 days.

(21) Appl. No.: 15/727,999

(22) Filed: Oct. 9, 2017

(65) Prior Publication Data
US 2018/0099642 A1   Apr. 12, 2018

(30) Foreign Application Priority Data
Oct. 12, 2016   (JP) .................................. 2016-200794

(51) Int. Cl.
*B60R 25/24*   (2013.01)
*E05F 15/77*   (2015.01)
(Continued)

(52) U.S. Cl.
CPC .............. *B60R 25/24* (2013.01); *B60R 25/01* (2013.01); *E05B 77/00* (2013.01); *E05F 15/77* (2015.01);
(Continued)

(58) Field of Classification Search
CPC ..... B60R 25/24; B60R 25/01; B60R 25/2036; H04L 67/12; H04W 4/80; H04W 4/33;
(Continued)

(56) References Cited

U.S. PATENT DOCUMENTS 8,149,083 B2   4/2012   Suzuki et al.
2005/0237152 A1*   10/2005   Nakashima ........... B60R 25/246
340/5.65
(Continued)

FOREIGN PATENT DOCUMENTS

JP   2007009624 A   1/2007
JP   2007138471 A   6/2007
(Continued)

OTHER PUBLICATIONS

Office Action issued in Japanese Application No. 2016-200794; dated Jul. 2, 2019 (8 pages).

*Primary Examiner* — Mary Cheung
(74) *Attorney, Agent, or Firm* — Osha Liang LLP

(57) ABSTRACT

In a door control system, a reservation signal is transmitted when a user operates a mobile device and reserves opening a door, a control device transmits a reservation acceptance signal and starts transmitting a response request signal upon receipt of the reservation signal. When the mobile device receives the reservation acceptance signal, a mobile device memory stores information indicating that the reservation is accepted and authorized and a notification unit notifies the user of authorization. When the mobile device receives the response request signal, the mobile device transmits a response signal including the stored information indicating authorization. When the control device receives the response signal including the information indicating authorization in response to the response request signal, a controller performs at least one of unlocking or opening the door.

6 Claims, 6 Drawing Sheets

(51) Int. Cl.
  B60R 25/01 (2013.01)
  E05B 77/00 (2014.01)
  H04L 29/08 (2006.01)
  *H04W 4/80* (2018.01)
  *H04W 4/48* (2018.01)
  *H04W 4/33* (2018.01)

(52) U.S. Cl.
  CPC .......... *H04L 67/12* (2013.01); *E05Y 2400/45* (2013.01); *E05Y 2400/85* (2013.01); *E05Y 2900/531* (2013.01); *H04W 4/33* (2018.02); *H04W 4/48* (2018.02); *H04W 4/80* (2018.02)

(58) Field of Classification Search
  CPC ...... H04W 4/48; G07C 9/00309; E05B 77/00; E05F 15/77; E05Y 2900/531; E05Y 2400/85; E05Y 2400/45
  See application file for complete search history.

(56) References Cited

U.S. PATENT DOCUMENTS

| | | | |
|---|---|---|---|
| 2006/0232131 A1* | 10/2006 | Endo | B60R 25/042 307/10.2 |
| 2009/0030579 A1 | 1/2009 | Takehisa | |
| 2011/0260831 A1* | 10/2011 | Ieda | B60R 25/246 340/5.64 |
| 2016/0208541 A1 | 7/2016 | Goto | |

FOREIGN PATENT DOCUMENTS

| | | | |
|---|---|---|---|
| JP | 200924454 A | | 2/2009 |
| JP | 2012172436 A | | 9/2012 |
| JP | 2015074938 A | * | 4/2015 |
| JP | 2015098687 A | | 5/2015 |
| JP | 2016108882 A | | 6/2016 |
| JP | 2016135959 A | | 7/2016 |

* cited by examiner

DOOR CONTROL SYSTEM, CONTROL DEVICE, AND MOBILE DEVICE

CROSS-REFERENCE TO RELATED APPLICATION

This application is based on Japanese Patent Application No. 2016-200794 filed with the Japan Patent Office on Oct. 12, 2016, the entire contents of which are incorporated herein by reference.

FIELD

The disclosure relates to a door control system, a control device, and a mobile device, and particularly relates to a door control system configured to have communication between a mobile device and a control device provided at a vehicle and control unlocking or opening a door of the vehicle, as well as a control device and a mobile device included in the door control system.

BACKGROUND

There has conventionally been known a technique of communicating between a mobile device and a control device provided at a vehicle and controlling automatically unlocking or opening a door of the vehicle. For example, JP 2007-138471 A discloses a vehicle door opening and closing apparatus configured to automatically open and close a door of a vehicle in accordance with intention of a user without sequential operation of an operation unit provided at the vehicle or an operation unit of a mobile device for remote control. The vehicle door opening and closing apparatus includes a recognizer configured to recognize presence of a mobile device of a vehicle user within a predetermined area with respect to the vehicle, a command unit provided at the mobile device configured to command opening and closing a door of the vehicle as intended by the vehicle user even outside the predetermined area of the recognizer, and a control unit configured to open or close the door in accordance with behavior of the recognizer and the command unit. The control unit opens the door when the command unit commands opening action and the recognizer recognizes that the mobile device is located within the predetermined area. The vehicle door opening and closing apparatus is further configured to close the door when the command unit commands closing action and the recognizer recognizes that the mobile device is not located within the predetermined area.

JP 2015-098687 A discloses a vehicle door control apparatus configured to automatically open a vehicle door when a user approaches the vehicle in consideration of circumstances around the vehicle and intention of the user. The vehicle door control apparatus includes a vehicle-side control device provided at the vehicle including an automatically openable door, and a mobile device configured to accept user's reservation setting for automatically opening the door. The mobile device includes a transmitter configured to transmit a signal including information on reservation setting through wireless communication. The vehicle-side control device includes a receiver configured to receive the signal from the mobile device, a first detector configured to detect the mobile device located in a first area adjacent to the door and having accepted the reservation setting in accordance with the signal received by the receiver, and a controller configured to determine that the door is intended to be opened if the first detector detects the mobile device having accepted the reservation setting within the first area and continuously detects the mobile device within the first area for a predetermined period.

JP 2016-108882 A discloses a door lock system configured to simplify operation of closing and locking a door. With the door lock system, when a user gets off a vehicle and closes the door while operating a user operation unit, a signal input unit in a collation ECU receives a detection signal from the user operation unit and a door opening and closing monitoring unit checks that the door is closed. A lock controller causes the door to be locked upon acceptance of user's intention to lock the door. The door is thus automatically locked when the door is completely closed, by closing the door while operating the user operation unit. The door lock system allows the door to be locked through single action of closing the door.

JP 2007-009624 A discloses a vehicle lock control apparatus requiring no complicated operation when a user gets on a vehicle. The vehicle lock control apparatus includes a lock detector configured to detect a locked state of an openable body provided on an outer surface of the vehicle, where the openable body is closed and locked, a user detector configured to detect whether or not the user is located within a predetermined area where the openable body is operable, an unlocking unit configured to unlock the openable body, an openable body opener configured to open the openable body, and a control unit configured to control the unlocking unit and the openable body opener to unlock the openable body and open the openable body when the user detector detects the user within the predetermined area in a state where the lock detector detects the locked state of the openable body.

SUMMARY

The disclosure provides a door control system configured to control unlocking or opening a vehicle door with improved convenience of a vehicle user and improved security, and also provides a control device and a mobile device included in the door control system.

In order to achieve the object mentioned above, one or more embodiments of the disclosure provides a door control system including: a control device provided at a vehicle and configured to transmit a response request signal for request of a response; and a mobile device configured to return a response signal to the response request signal; the door control system configured to control at least one of unlocking or opening a door of the vehicle in accordance with the response signal; the mobile device configured to transmit a reservation signal for reservation of at least one of unlocking or opening the door to the control device in accordance with operation by a user, and the control device configured to transmit, to the mobile device, a reservation acceptance signal indicating acceptance of the reservation signal, in which the mobile device includes an operation unit configured to accept operation of the user making reservation of at least one of unlocking or opening the door, a mobile device transmitter configured to transmit the response signal, and the reservation signal when the operation unit is operated, a mobile device first receiver configured to receive the reservation acceptance signal from the control device, a mobile device second receiver configured to receive the response request signal from the control device, a mobile device memory that stores information received by the mobile device first receiver, and a notification unit configured to notify the user, in which the control device includes a control device receiver configured to receive the reservation signal and the response signal from the mobile device, a control device first transmitter configured to transmit the reservation acceptance signal, a control device second transmitter configured to transmit the response request signal, and a controller configured to control at least one of unlocking or opening the door, in which, when the control device receiver receives the reservation signal, the control device first transmitter transmits the reservation acceptance signal and the control device second transmitter starts transmitting the response request signal, in which, when the mobile device first receiver receives the reservation acceptance signal, the mobile device memory stores information indicating that the reservation is accepted and authorized, and the notification unit notifies the user of the authorization, in which, when the mobile device second receiver receives the response request signal after the control device second transmitter starts transmitting the response request signal, the mobile device transmitter transmits the response signal including the information indicating authorization, and in which, when the control device receiver receives the response signal including the information indicating authorization in response to the response request signal, the controller performs at least one of unlocking or opening the door.

In a case where the user voluntarily reserves locking or opening the door of the vehicle, this configuration causes the door to be unlocked or opened when the user approaches the vehicle with no operation of the mobile device or the like, to achieve provision of the door control system improved in convenience of the user.

Optionally, the control device second transmitter stops transmitting the response request signal when a predetermined period elapses after starting transmission of the response request signal.

This configuration limits a reservation valid period to the predetermined period for security improvement.

Optionally, the control device further includes a control device memory that stores an identification number of the mobile device, in which the mobile device transmitter transmits the reservation signal and the response signal each including the identification number of the mobile device, in which, when the control device receiver receives the reservation signal including the identification number, the control device memory stores the identification number, and in which, when the control device receiver receives the response signal including the information indicating authorization in response to the response request signal, the controller collates the identification number included in the response signal with the identification number stored in the control device memory, and performs at least one of unlocking or opening the door only when the identification numbers match each other.

This configuration causes the door to be unlocked and/or opened only in the case where the approached mobile device is identical to the mobile device having made reservation, for security improvement and prevention of erroneous behavior.

Optionally, when the control device first transmitter transmits the reservation acceptance signal, the control device memory stores information indicating that the reservation is accepted and authorized, in which, when the control device receiver receives the response signal including the information indicating authorization in response to the response request signal, the controller inspects whether or not the control device memory stores the information indicating authorization, and performs at least one of unlocking or opening the door only when the information indicating authorization is stored, and in which, when at least one of unlocking or opening the door is performed, the control device memory deletes the information indicating authorization.

This configuration causes the door to be unlocked and/or opened only in the case where the response signal including the information indicating authorization is received from the mobile device and the control device stores the information indicating authorization, for security improvement.

In order to achieve the above object, one or more embodiments of the disclosure provides a mobile device configured to return a response signal to a response request signal for request of a response, transmitted from a control device provided at a vehicle, regarding control of at least one of unlocking or opening a door of the vehicle, the mobile device configured to transmit in accordance with operation by a user, to the control device, a reservation signal for reservation of at least one of unlocking or opening the door, and receive, from the control device, a reservation acceptance signal indicating acceptance of the reservation signal, the mobile device including: an operation unit configured to accept operation of the user making reservation of at least one of unlocking or opening the door; a mobile device transmitter configured to transmit the response signal, and the reservation signal when the operation unit is operated; a mobile device first receiver configured to receive the reservation acceptance signal from the control device; the mobile device second receiver configured to receive the response request signal from the control device; the mobile device memory that stores information received by the mobile device first receiver; and a notification unit configured to notify the user; in which, when the mobile device first receiver receives the reservation acceptance signal transmitted from the control device in response to the reservation signal, the mobile device memory stores information indicating that the reservation is accepted and authorized and the notification unit notifies the user of the authorization, and in which, when the mobile device second receiver receives the response request signal started transmitted by the control device in response to the reservation signal, the mobile device transmitter transmits the response signal including the information indicating authorization to cause the control device to control at least one of unlocking or opening the door.

In a case where the user voluntarily reserves unlocking or opening the door of the vehicle, this configuration causes the door to be unlocked or opened when the user approaches the vehicle with no operation of the mobile device or the like, to achieve provision of the mobile device improved in convenience of the user.

In order to achieve the above object, one or more embodiments of the disclosure provides a control device provided at a vehicle and configured to transmit a response request signal for request of a response regarding at least one of unlocking or opening a door of the vehicle, receive a response signal returned from a mobile device in response to the response request signal, and control at least one of unlocking or opening the door, the control device configured to transmit, to the mobile device having transmitted a reservation signal for reservation of at least one of unlocking or opening the door in accordance with operation of a user, a reservation acceptance signal indicating acceptance of the reservation signal, the control device including: a control device receiver configured to receive the reservation signal and the response signal from the mobile device; a control device first transmitter configured to transmit the reservation acceptance signal to the mobile device when the control device receiver receives the reservation signal from the mobile device; a control device second transmitter configured to start transmitting the response request signal when the control device receiver receives the reservation signal from the mobile device; and a controller configured to control at least one of unlocking or opening the door; in which, when the control device receiver receives the reservation signal, the control device first transmitter transmits the reservation acceptance signal and the control device second transmitter starts transmitting the response request signal, and in which, when the control device receiver receives the response signal including information indicating that the reservation is accepted and authorized, transmitted from the mobile device having received the reservation acceptance signal after the control device second transmitter starts transmitting the response request signal, the controller performs at least one of unlocking or opening the door.

In a case where the user voluntarily reserves unlocking or opening the door of the vehicle, this configuration causes the door to be unlocked or opened when the user approaches the vehicle with no operation of the mobile device or the like, to achieve provision of the control device that is mounted on the vehicle and is improved in convenience of the user.

The disclosure provides a door control system configured to control unlocking or opening a vehicle door with improved convenience of a vehicle user and improved security, and provides also a control device and a mobile device included in the door control system.

DETAILED DESCRIPTION

Figure 1:
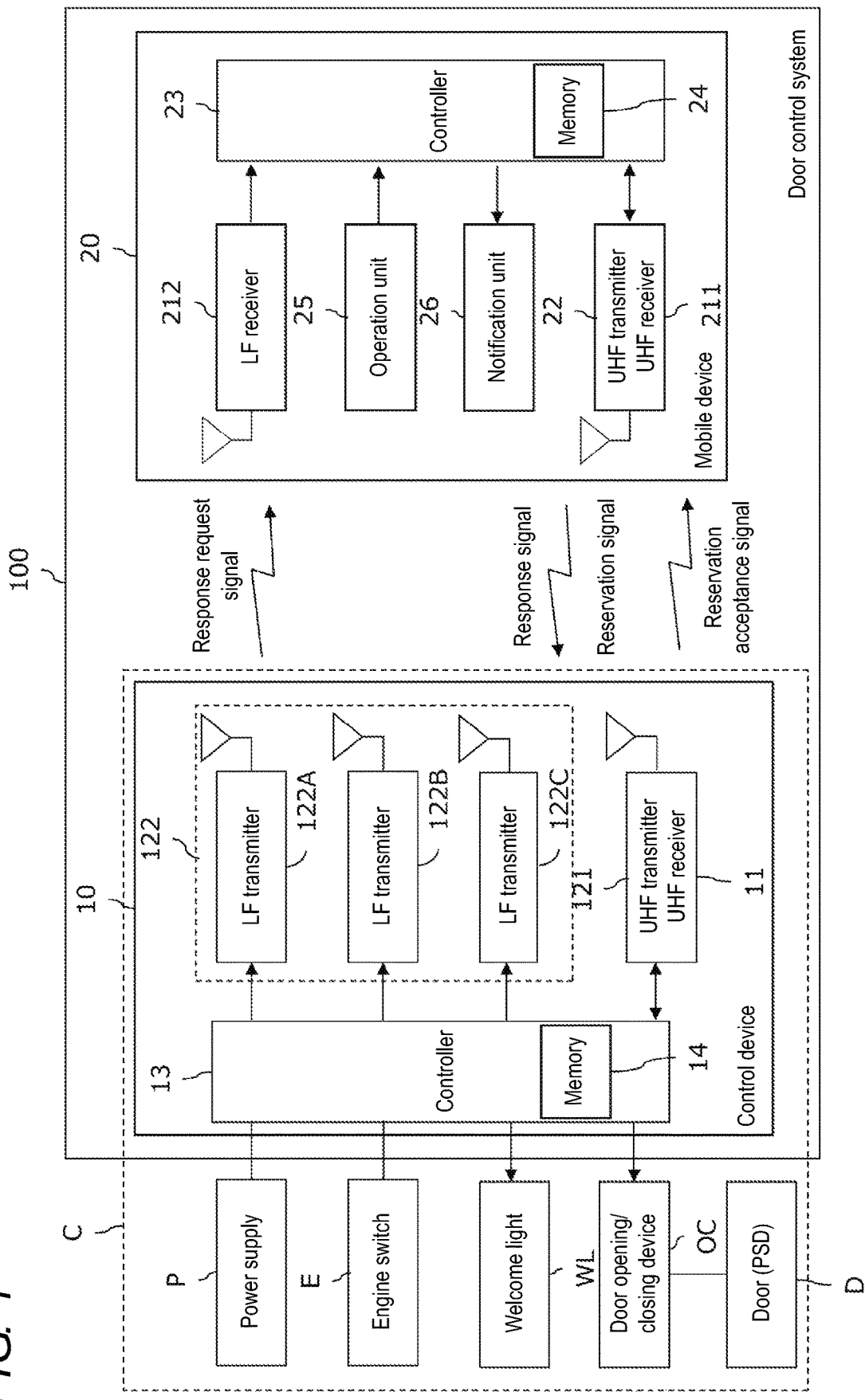
FIG. 1 is a block diagram of a door control system according to one or more embodiments of the disclosure.

Embodiments of the disclosure will be described with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figure 2:
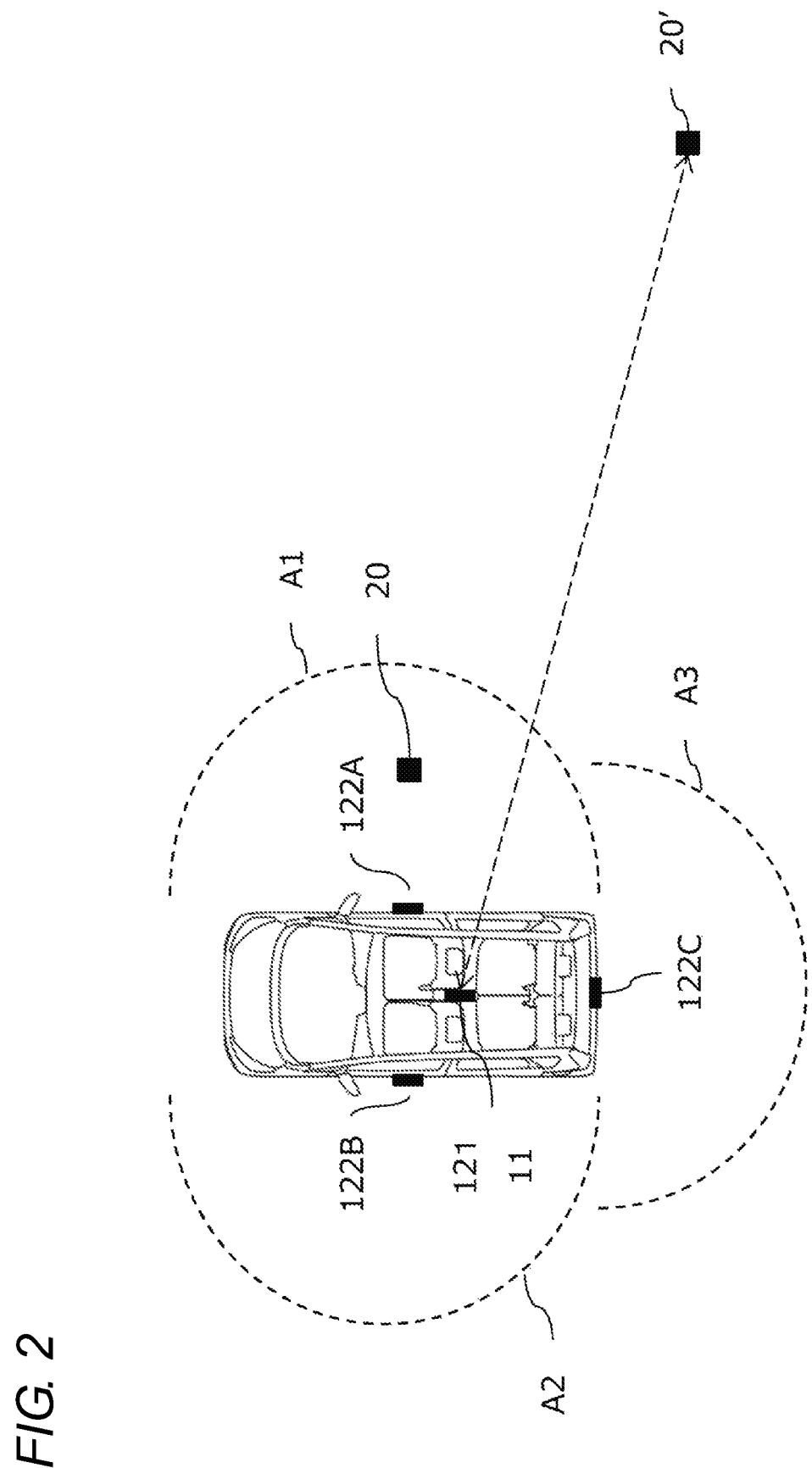
FIG. 2 is an explanatory view indicating coverage areas of a response request signal, in the door control system according to one or more embodiments of the disclosure.

A door control system 100 according to one or more embodiments of the disclosure will now be described with reference to FIGS. 1 and 2. The door control system 100 includes a control device 10 provided at a vehicle C, and a mobile device 20 carried by a user of the vehicle C and configured to communicate with the control device 10. The control device 10 transmits a response request signal to request the mobile device 20 to respond, and the mobile device 20 returns a response signal to the response request signal. The control device 10 in the door control system 100 controls either one of or both unlocking and opening a door D of the vehicle C in accordance with the response signal returned from the mobile device 20. The control device 10 can alternatively control only unlocking or both unlocking and opening the door D of the vehicle C in accordance with the response signal returned from the mobile device 20. The door D described herein is configured as a power sliding door (hereinafter, referred to as a PSD). A PSD is provided typically on a side of the vehicle C and is configured to electromotively slide to be opened and closed. Opening the PSD indicates laterally sliding a closed PSD to be opened.

The mobile device 20 includes an operation unit 25 configured to accept operation of the user, a mobile device UHF transmitter 22 functioning as a mobile device transmitter configured to transmit a reservation signal for reservation to unlock and/or open the door D to the control device 10 when the operation unit 25 is operated, a mobile device UHF receiver 211 functioning as a mobile device first receiver configured to receive a reservation acceptance signal from the control device 10, an LF receiver 212 functioning as a mobile device second receiver configured to receive a response request signal from the control device 10, a mobile device memory 24 that stores information received by the mobile device UHF receiver 211, a notification unit 26 configured to notify the user, and a mobile device controller 23 configured to control these units.

The operation unit 25 is configured as a button provided at the mobile device 20 or the like and operated by the user to reserve unlocking and/or opening the door D. The user operates the operation unit 25 upon heading for the vehicle C to be reached within a predetermined period, to reserve unlocking and/or opening the door D with no operation performed at a position adjacent to the vehicle C. When the operation unit 25 is pressed, the mobile device controller 23 detects the operation and causes the mobile device UHF transmitter 22 to transmit as follows.

When the operation unit 25 is operated, the mobile device UHF transmitter 22 transmits, to the control device 10, a UHF wave including a reservation signal for reservation to unlock and/or open the door D. The UHF wave including the reservation signal can typically reach a longer distance than an LF wave to be described later. The user can thus reserve unlocking and/or opening the door D by operating the operation unit 25 even from a relatively long distance from the vehicle C. In a case where the LF receiver 212 receives a response request signal in an LF band from the control device 10, the mobile device UHF transmitter 22 transmits a response signal with a UHF wave to the response request signal. In the case where the LF receiver 212 receives the response request signal in the LF band reaching a shorter distance, the mobile device UHF transmitter 22 transmits the response signal in a UHF band reaching a longer distance to ensure transmission of the response signal to the control device 10. As to be described later, the mobile device UHF receiver 211 receives a reservation acceptance signal transmitted in the UHF band from the control device 10.

In accordance with the reservation signal for reservation to unlock and/or open the door D transmitted from the mobile device UHF transmitter 22, the mobile device memory 24 stores information on the reservation acceptance signal received by the mobile device UHF receiver 211 from the control device 10, in other words, information indicating acceptance and authorization of the reservation. The mobile device memory 24 can be provided in a temporary memory area in the mobile device controller 23 configured by a microcomputer, or can be provided in a permanent memory. When the mobile device UHF receiver 211 functioning as the mobile device first receiver receives a reservation acceptance signal, the notification unit 26 notifies the user of authorization. The notification unit 26 can notify in any one of visual, auditory, and tactile manners, or in any combination of these manners. For example, the notification unit 26 can include a light emitting diode to be turned on in a predetermined pattern for visual notification. The notification unit 26 can include a bell to be rung in a predetermined pattern for auditory notification. The notification unit 26 can include a vibrating motor to be vibrated in a predetermined pattern for tactile notification.

The control device 10 includes a control device UHF receiver 11 functioning as a control device receiver configured to receive a reservation signal and a response signal from the mobile device 20, a control device UHF transmitter 121 functioning as a control device first transmitter configured to transmit a reservation acceptance signal, an LF transmitter 122 functioning as a control device second transmitter configured to transmit a response request signal, and a control device controller 13 configured to control unlocking and/or opening the door D. The control device UHF receiver 11 notifies the control device controller 13 upon receipt of a reservation signal transmitted from the mobile device 20 when the operation unit 25 is operated. The control device controller 13 notified of receipt of the reservation signal causes the control device UHF transmitter 121 functioning as the control device first transmitter to transmit a reservation acceptance signal, and causes the LF transmitter 122 functioning as the control device second transmitter to start transmission of a response request signal. The LF transmitter 122 thereafter transmits the response request signal continuously at a predetermined interval for a predetermined period.

A response request signal is transmitted in an LF wave by the LF transmitter 122, and the LF wave does not reach a longer distance than a UHF wave does. A wave in the LF band has a longer wavelength and has radiant intensity significantly reduced (in inverse proportion to the cube of a distance) in comparison to a wave in the UHF band in a distance order to the vehicle C and the vicinity thereof. The response request signal thus reaches the mobile device 20 located within coverage areas A1, A2, and A3 indicated in FIG. 2, but fails to reach a mobile device 20' located outside the coverage areas. FIG. 2 depicts three LF transmitters 122A, 122B, and 122C disposed close to a right door, a left door, and a rear door, respectively, and the coverage areas A1, A2, and A3 of response request signals transmitted from the three LF transmitters 122A, 122B, and 122C, respectively. Meanwhile, a reservation signal and a reservation acceptance signal are transmitted in a UHF wave from the mobile device UHF transmitter 22 and the control device UHF transmitter 121, respectively, and can thus be communicated between the vehicle C and the mobile device 20' positioned relatively far away from the vehicle C and outside the coverage areas A1, A2, and A3 of the response request signal.

The reservation acceptance signal transmitted from the control device 10 in response to the reservation signal is then received by the mobile device 20', whereas the response request signal started transmitted substantially simultaneously is not received by the mobile device 20'. When the mobile device UHF receiver 211 functioning as the mobile device first receiver receives the reservation acceptance signal, the mobile device memory 24 stores information indicating that the reservation is accepted by the control device 10 and has come into an authorized state (is authorized). The notification unit 26 then notifies the user of authorization of unlocking and/or opening the door D when the user approaches the vehicle C. The operation unit 25 can further be configured to accept reservation canceling operation. In this case, the notified user can perform canceling operation to cancel the reservation.

The user, who is notified of authorization of unlocking and/or opening the door D upon approach to the vehicle C, gradually approaches the vehicle C, specifically, the coverage areas A1, A2, and A3 of the response request signal. The LF transmitter 122 functioning as the control device second transmitter continuously transmits the response request signal at the predetermined interval for the predetermined period after starting transmission of the response request signal. If the user enters the coverage area A1, A2, or A3 of the response request signal within the predetermined period for continuous transmission of the response request signal and the LF receiver 212 receives a response request signal, the mobile device UHF transmitter 22 automatically returns a response signal without user operation. The mobile device UHF transmitter 22 returns the response signal including information indicating authorization obtained by receipt of the reservation acceptance signal.

The control device controller 13 is configured by a microcomputer, and is connected with a door opening and closing device OC configured to drive the door D, a welcome light WL, an engine switch E, a power supply P, and the like. The control device controller 13 controls the control device UHF receiver 11, the control device UHF transmitter 121, and the LF transmitter 122, and controls unlocking and/or opening the door D of the vehicle C upon receipt of a response signal from the mobile device 20. Specifically, when the control device UHF receiver 11 functioning as the control device receiver receives the response signal including the information indicating authorization in response to the response request signal, the control device controller 13 commands the door opening and closing device OC to unlock and/or open the door D. The control device controller 13 unlocks or opens the door D upon receipt of, not a response signal but the response signal including the information indicating authorization, to distinguish the mobile device 20 that has not made the reservation. The mobile device 20, which has not made reservation and has not received any reservation acceptance signal, cannot transmit any response signal including information indicating authorization even when the mobile device 20 approaches the vehicle C, so that the control device 10 will neither unlock nor open the door D. This configuration prevents the door D from being carelessly opened or the like when the mobile device 20 not having made reservation approaches.

The control device controller 13 can simultaneously command the welcome light WL to be lit to notify opening or the like the door, or can command the power supply P or the engine switch E to power on the vehicle C or start the engine. When the user voluntarily reserves unlocking or opening the door D of the vehicle C, the door D is unlocked or opened when the user approaches the vehicle C with no operation of the mobile device 20 or the like. This achieves provision of the door control system 100 improved in convenience of the user.

The operation unit 25 of the mobile device 20 can optionally be configured to be selectable whether opening the right door D of the vehicle C is reserved, opening the left door D is reserved, or the like. In this case, only the selected door D can be opened when the user approaches the vehicle C with no operation of the mobile device 20 or the like. This achieves provision of the door control system 100 improved in convenience of the user as well as in security to prevent any unselected door D from being opened carelessly.

The control device 10 can further include a control device memory 14 that stores an identification number of the mobile device 20. In this case, the mobile device UHF transmitter 22 functioning as the mobile device transmitter transmits a reservation signal and a response signal including the identification number of the mobile device 20. When the user operates the operation unit 25 of the mobile device 20 and the control device UHF receiver 11 receives a reservation signal including the identification number of the mobile device 20, the control device memory 14 stores the identification number. The LF transmitter 122 then starts transmitting a response request signal. When the control device UHF receiver 11 receives a response signal including information indicating authorization in response to the response request signal and the identification number of the mobile device 20, the control device controller 13 collates the identification number included in the response signal with the identification number preliminarily stored in the control device memory 14 and unlocks and/or opens the door D only in a case where the identification numbers match each other. This configuration causes the door D to be unlocked and/or opened only in the case where the approached mobile device 20 is identical to the mobile device 20 having made reservation, for security improvement and prevention of erroneous behavior.

When the control device UHF transmitter 121 transmits a reservation acceptance signal, the control device memory 14 can optionally store information indicating that the reservation made by the mobile device 20 is accepted and authorized. In this case, when the user thereafter approaches the vehicle C and the control device UHF receiver 11 receives a response signal including information indicating authorization in response to a response request signal, the control device controller 13 inspects whether or not the control device memory 14 stores the information indicating authorization. The control device controller 13 unlocks and/or opens the door D only in a case where the control device memory 14 stores the information indicating authorization. The control device memory 14 deletes the information indicating authorization when the door D is unlocked and/or opened. This configuration causes the door D to be unlocked and/or opened only when a response signal including information indicating authorization is received from the mobile device 20 and the control device 10 stores the information indicating authorization, for further security improvement.

Figure 3:
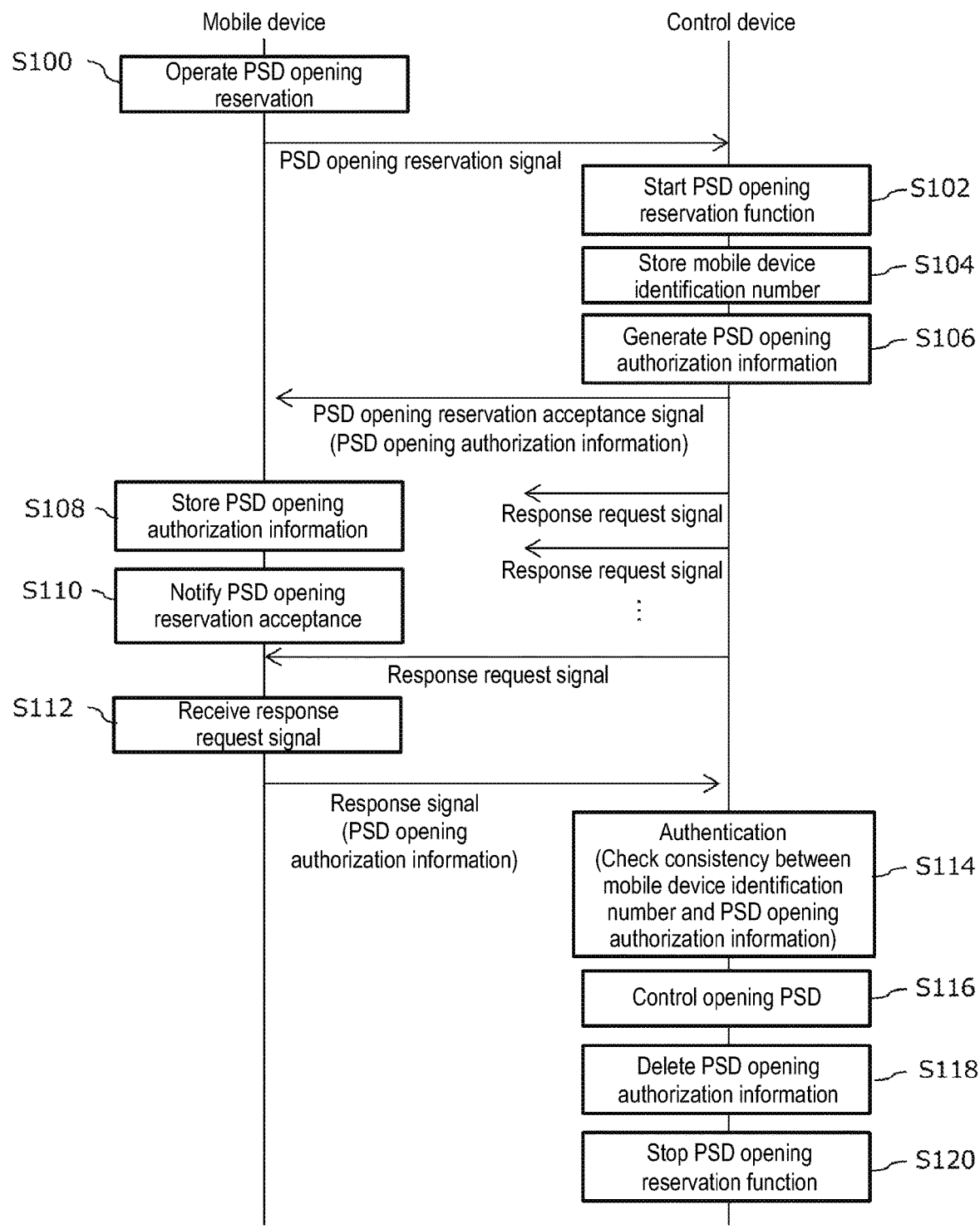
FIG. 3 is a flowchart schematically depicting a control method in the door control system according to one or more embodiments of the disclosure.

Described below is a method of controlling the door control system 100 with reference to FIG. 3. Hereinafter, symbol S denotes step. In S100, the mobile device 20 accepts reservation operation for opening the PSD via the operation unit 25. The mobile device UHF transmitter 22 of the mobile device 20 then transmits, to the control device 10, a reservation signal for reservation to open the PSD along with the own identification number. When the control device UHF receiver 11 of the control device 10 receives the reservation signal, the control device controller 13 starts a reservation function for opening the PSD in S102. In S104, the control device memory 14 stores the identification number of the mobile device 20 included in the reservation signal. In S106, the control device controller 13 generates information indicating that the reservation to open the PSD is accepted and authorized. The control device memory 14 then stores the information indicating that the reservation made by the mobile device 20 is accepted and authorized. The information indicating authorization is made distinguishable from information generated at different time by means of a rolling code or the like.

The control device UHF transmitter 121 transmits, to the mobile device 20, the information indicating authorization for opening the PSD as a reservation acceptance signal. The LF transmitter 122 of the control device 10 starts transmitting a response request signal, and continues the transmission at a predetermined interval for a predetermined period. When the mobile device UHF receiver 211 receives the reservation acceptance signal, the mobile device memory 24 stores, in S108, information indicating that the reservation to open the PSD is accepted and authorized by the control device 10. In S110, the notification unit 26 subsequently notifies the user that the reservation to open the PSD is accepted and authorized by the control device 10.

The user notified of authorization to the reservation to open the PSD and carrying the mobile device 20 approaches the vehicle C. The response request signal does not reach the mobile device 20 when the reservation is made, but the user approaches the vehicle C to enter the coverage area of the response request signal. Then in S112, the LF receiver 212 of the mobile device 20 receives the response request signal from the control device 10. Upon receipt of the response request signal, the mobile device UHF transmitter 22 transmits, to the control device 10, a response signal including the own identification number in response to the response request signal, along with the information indicating authorization stored in the mobile device memory 24.

When the control device UHF receiver 11 receives the response signal, the control device controller 13 authenticates the mobile device 20 in accordance with the response signal in S114. Specifically, the control device controller 13 checks whether or not the identification number of the mobile device 20 included in the response signal matches the identification number stored in the control device memory 14 (S104) as the identification number of the mobile device 20 having made the reservation. The control device controller 13 further checks whether or not the information indicating authorization included in the response signal matches the information indicating authorization generated by the control device controller 13 itself (S106) and stored in the control device memory 14.

When matching is confirmed on these two points, the control device controller 13 controls opening the PSD in S116. When the PSD is opened, the control device controller 13 deletes, in S118, the information indicating authorization stored in the control device memory 14. In S120, the control device controller 13 stops the reservation function for opening the PSD.

Figure 4:
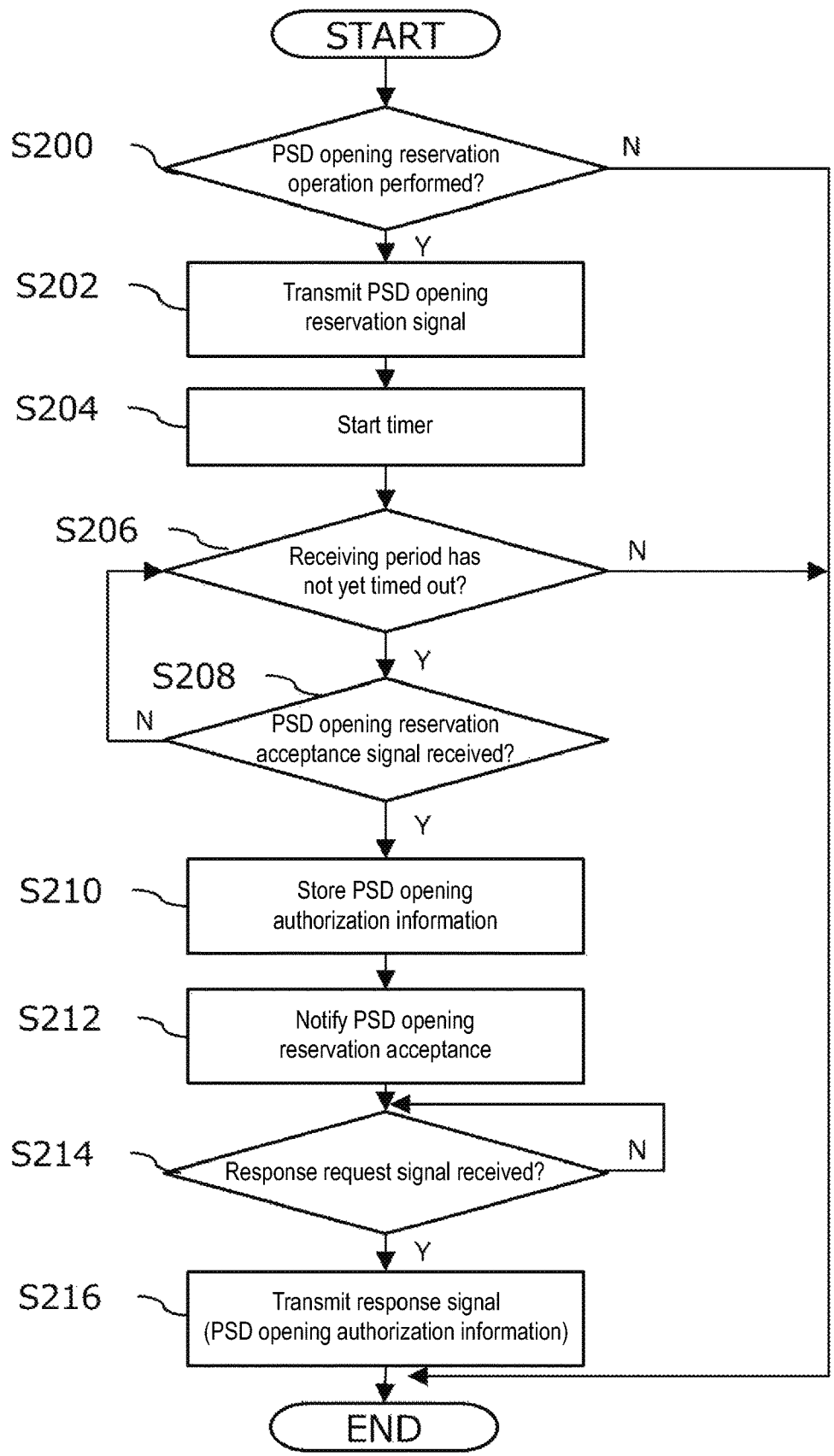
FIG. 4 is a flowchart depicting a method of controlling a mobile device in the door control system according to one or more embodiments of the disclosure.

A method of controlling the mobile device 20 will be described in more detail with reference to FIG. 4. In S200, the mobile device controller 23 checks whether or not the operation unit 25 is operated for reservation to open the PSD. The mobile device controller 23 ends control if no reservation operation is made, and performs as follows if reservation operation is made.

In S202, the mobile device UHF transmitter 22 of the mobile device 20 transmits, to the control device 10, a reservation signal for reservation to open the PSD along with the own identification number. The mobile device controller 23 starts a timer to measure a predetermined period in S204 and stands by for receipt of a reservation acceptance signal by the mobile device UHF receiver 211 in S208 until the predetermined period ends in S206. The predetermined period lasts ten seconds or the like in this case.

When the mobile device UHF receiver 211 receives the reservation acceptance signal, the mobile device memory 24 stores information indicating that the reservation is accepted and authorized by the control device 10 in S210. Then in S212, the notification unit 26 notifies the user that the reservation to open the PSD is accepted and authorized by the control device 10. The mobile device 20 stands by to receive a response request signal in S214. When the user carrying the mobile device 20 approaches the vehicle C and the LF receiver 212 receives the response request signal, the mobile device UHF transmitter 22 transmits in S216, to the control device 10, a response signal including the own identification number and the information indicating authorization stored in the mobile device memory 24.

Figure 5:
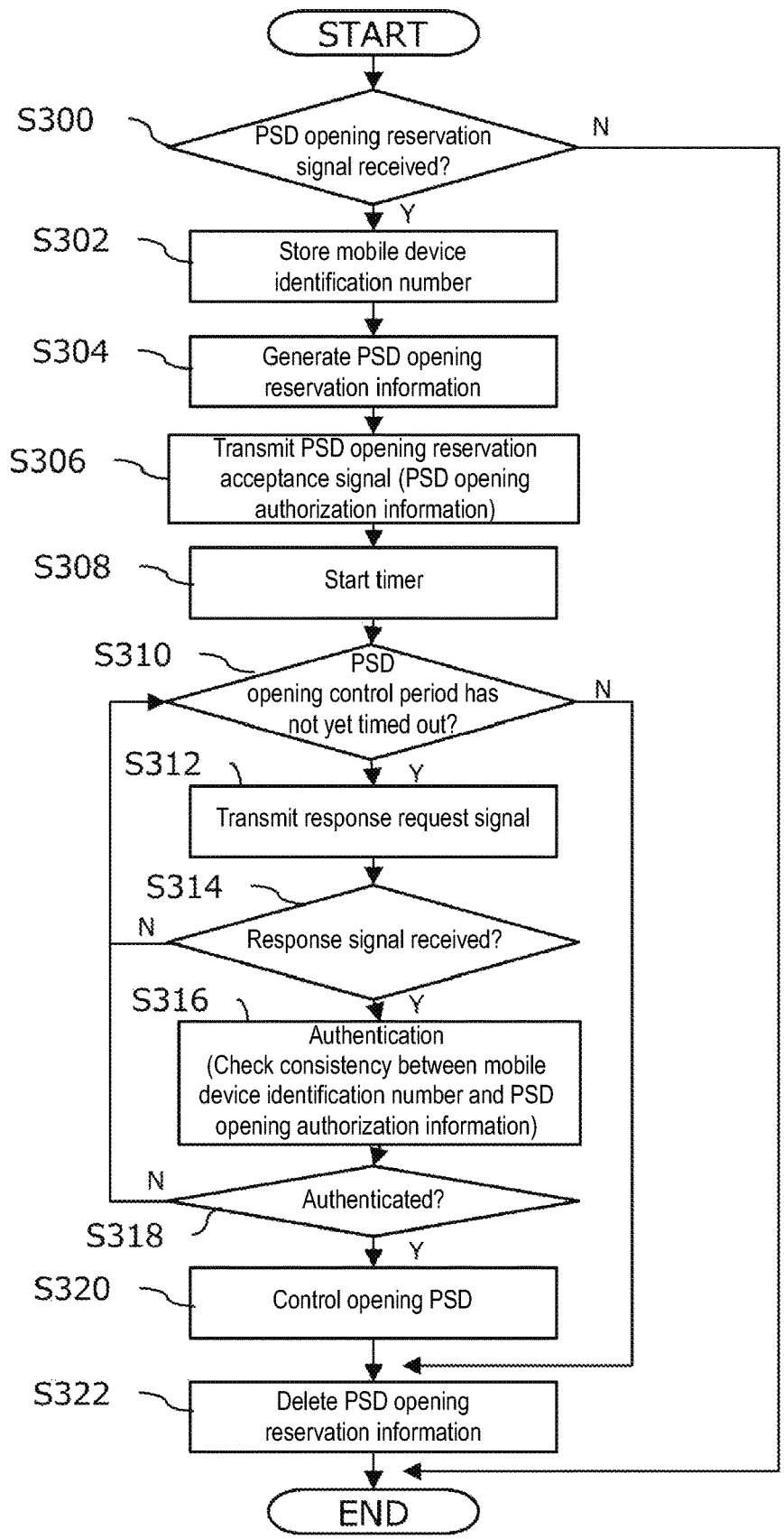
FIG. 5 is a flowchart depicting a method of controlling a control device in the door control system according to one or more embodiments of the disclosure.

A method of controlling the control device 10 will be described in more detail with reference to FIG. 5. In S300, the control device controller 13 checks whether or not a reservation signal for reservation to open the PSD is received from the mobile device 20. The control device controller 13 ends control if no reservation signal is received, and performs as follows if the reservation signal is received.

In S302, the control device memory 14 stores the identification number of the mobile device 20 included in the reservation signal transmitted from the mobile device 20. In S304, the control device controller 13 generates information indicating that the reservation to open the PSD is accepted by receipt of the reservation signal and is authorized, so as to be distinguishable by a rolling code. When the information indicating authorization is generated, the control device UHF transmitter 121 transmits a reservation acceptance signal including the information indicating authorization in S306. In S308, the control device controller 13 starts the timer to measure a predetermined period. The predetermined period in this case corresponds to a period of approach to the vehicle C by the user, and thus lasts about 15 minutes.

The control device controller 13 measures with use of the timer in S310, and ends control when the predetermined period has elapsed, and performs as follows within the predetermined period. The control device UHF transmitter 121 transmits a reservation acceptance signal including the information indicating authorization, and the LF transmitter 122 starts transmitting a response request signal to the mobile device 20 in S312. In S314, the control device controller 13 continuously checks whether or not a response signal to the response request signal is received from the mobile device 20.

When the control device UHF receiver 11 receives the response signal, the control device controller 13 authenticates the mobile device 20 in accordance with the response signal in S316. Specifically, the control device controller 13 checks whether or not the identification number of the mobile device 20 included in the response signal matches the identification number stored in the control device memory 14 (S302) as the identification number of the mobile device 20 having made the reservation. The control device controller 13 further checks whether or not the information indicating authorization included in the response signal matches the information indicating authorization generated by the control device controller 13 itself (S304) and stored in the control device memory 14.

In S318, the control device controller 13 inspects whether or not authentication is successful. If matching is not confirmed on these two points, the authentication is unsuccessful and the response request signal is continuously transmitted for the predetermined period set by the timer. When authentication is successful, the control device controller 13 controls opening the PSD in S320. Then in S322, the control device controller 13 deletes the information indicating authorization stored in the control device memory 14.

Figure 6:
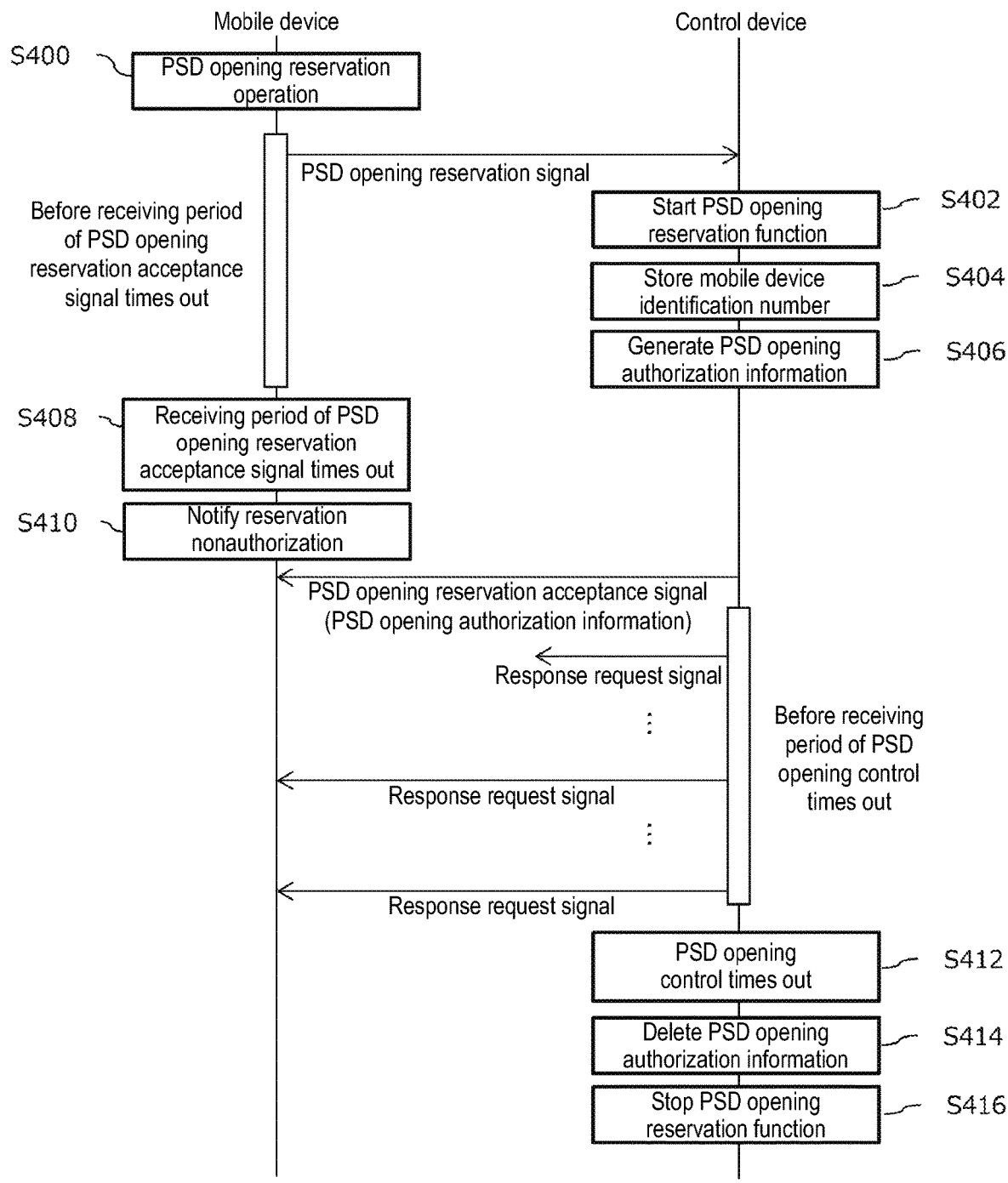
FIG. 6 is a flowchart depicting a control method upon timeout in the door control system according to one or more embodiments of the disclosure.

Described next is control upon timeout with reference to FIG. 6. In S400, the mobile device 20 accepts reservation operation for opening the PSD via the operation unit 25. The mobile device UHF transmitter 22 of the mobile device 20 then transmits, to the control device 10, a reservation signal for reservation to open the PSD along with the own identification number. In S208 mentioned earlier, the mobile device controller 23 sets a predetermined period (for example, ten seconds) for standing by to receive the reservation acceptance signal from the control device 10 by the mobile device UHF receiver 211.

When the control device UHF receiver 11 of the control device 10 receives the reservation signal, the control device controller 13 starts the reservation function for opening the PSD in S402. In S404, the control device memory 14 stores the identification number of the mobile device 20. In S406, the control device controller 13 generates information indicating that the reservation to open the PSD is accepted and authorized.

In a case where the control device UHF transmitter 121 does not transmit, to the mobile device 20, information indicating authorization as a reservation acceptance signal before the predetermined period set by the mobile device controller 23 elapses and times out, the mobile device controller 23 determines timeout (S206) in S408 and notifies the user of no receipt of information indicating authorization in S410.

This is unknown to the control device 10, so that the LF transmitter 122 of the control device 10 starts transmitting a response request signal. Even if the mobile device controller 23 receives any reservation acceptance signal including information indicating authorization after determining timeout, the mobile device controller 23 disregards the reservation acceptance signal. The LF transmitter 122 of the control device 10 thereafter continues the transmission at the predetermined interval for the predetermined period, but does not receive any response signal before the predetermined period times out. The control device controller 13 thus determines that control relevant to reservation to open the PSD has timed out in S412, and the LF transmitter 122 functioning as the control device second transmitter stops transmitting the response request signal. The LF transmitter 122 functioning as the control device second transmitter stops transmitting the response request signal when the predetermined period elapses after starting transmission of the response request signal. Such limitation of reservation validity to the predetermined period improves security.

Upon timeout, the control device controller 13 deletes, in S414, the information indicating authorization stored in the control device memory 14. In S416, the control device controller 13 stops the reservation function for opening the PSD.

As described above, the mobile device 20 in the door control system 100 is configured to return a response signal to a response request signal for request of a response, transmitted from the control device 10 provided at the vehicle C, regarding control unlocking and/or opening the door D of the vehicle C. The mobile device 20 is configured to transmit a reservation signal for reservation to unlock and/or open the door D to the control device 10 in accordance with operation of a user, and receive, from the control device 10, a reservation acceptance signal indicating acceptance of the reservation signal.

The mobile device 20 includes the operation unit 25 configured to accept operation of the user making reservation to unlock and/or open the door D, the mobile device UHF transmitter 22 functioning as the mobile device transmitter configured to transmit a response signal, and a reservation signal when the operation unit 25 is operated, the mobile device UHF receiver 211 functioning as the mobile device first receiver configured to receive a reservation acceptance signal from the control device 10, the LF receiver 212 functioning as the mobile device second receiver configured to receive a response request signal from the control device 10, the mobile device memory 24 that stores information received by the mobile device UHF receiver 211, and the notification unit 26 configured to notify the user.

When the mobile device UHF receiver 211 receives a reservation acceptance signal transmitted from the control device 10 in response to the reservation signal, the mobile device memory 24 in the mobile device 20 stores information indicating that the reservation is accepted and authorized, and the notification unit 26 notifies the user of authorization. When the LF receiver 212 receives a response request signal started transmitted by the control device 10 in response to the reservation signal, the mobile device UHF transmitter 22 transmits a response signal including information indicating authorization in order for control unlocking and/or opening the door D by the control device 10. In a case where the user voluntarily reserves locking or opening the door of the vehicle C, this configuration causes the door D to be unlocked or opened when the user approaches the vehicle C with no operation of the mobile device 20 or the like, to achieve provision of the mobile device 20 improved in convenience of the user.

As described above, the control device 10 in the door control system 100 is provided at the vehicle C and is configured to transmit a response request signal for request of a response regarding unlocking and/or opening the door D of the vehicle C, receive a response signal returned from the mobile device 20 in response to the response request signal, and control unlocking and/or opening the door D. The control device 10 is configured to transmit a reservation acceptance signal indicating acceptance of a reservation signal to the mobile device 20 that has transmitted the reservation signal for reservation to unlock and/or open the door D in accordance with operation by the user.

The control device 10 includes the control device UHF receiver 11 functioning as the control device receiver configured to receive a reservation signal and a response signal from the mobile device 20, the control device UHF transmitter 121 functioning as the control device first transmitter configured to transmit a reservation acceptance signal to the mobile device 20 when the control device UHF receiver 11 receives the reservation signal from the mobile device 20, the LF transmitter 122 functioning as the control device second transmitter configured to start transmitting a response request signal when the control device UHF receiver 11 receives the reservation signal from the mobile device 20, and the control device controller 13 configured to control unlocking and/or opening the door D.

In the control device 10, when the control device UHF receiver 11 receives a reservation signal, the control device UHF transmitter 121 transmits a reservation acceptance signal and the LF transmitter 122 starts transmitting a response request signal. When the control device UHF receiver 11 receives a response signal including information indicating that the reservation is accepted and authorized and transmitted from the mobile device 20 having received the reservation acceptance signal after the LF transmitter 122 starts transmitting the response request signal, the control device controller 13 controls unlocking and/or opening the door D. In a case where the user voluntarily reserves locking or opening the door of the vehicle C, this configuration causes the door D to be unlocked or opened when the user approaches the vehicle C with no operation of the mobile device 20 or the like, to achieve provision of the control device 10 that is mounted on the vehicle C and is improved in convenience of the user.

The invention is not limited to the illustrated embodiment, and can be embodied in a configuration within the scope not departing from the features recited in the respective claims. The invention is depicted and described particularly with regard mainly to the specific embodiment. An illustrative embodiment can variously be modified by those skilled in the art in terms of quantity and other detailed configurations without departing from the scopes of the technical idea and the object of the present invention.

The invention claimed is:

1. A door control system comprising:
   a control device provided at a vehicle and configured to transmit a response request signal for request of a response; and
   a mobile device configured to return a response signal to the response request signal; the door control system configured to control at least one of unlocking or opening a door of the vehicle in accordance with the response signal;
   the mobile device configured to transmit a reservation signal for reservation of at least one of unlocking or opening the door to the control device in accordance with operation by a user, and the control device configured to transmit, to the mobile device, a reservation acceptance signal indicating acceptance of the reservation signal,
   wherein the mobile device includes
   an operation unit configured to accept operation of the user making reservation of at least one of unlocking or opening the door,
   a mobile device transmitter configured to transmit the response signal, and the reservation signal when the operation unit is operated,
   a mobile device first receiver configured to receive the reservation acceptance signal from the control device,
   a mobile device second receiver configured to receive the response request signal from the control device,
   a mobile device memory that stores information received by the mobile device first receiver, and
   a notification unit configured to notify the user,
   wherein the control device includes
   a control device receiver configured to receive the reservation signal and the response signal from the mobile device,
   a control device first transmitter configured to transmit the reservation acceptance signal,
   a control device second transmitter configured to transmit the response request signal, and
   a controller configured to control at least one of unlocking or opening the door,
   wherein, when the control device receiver receives the reservation signal, the control device first transmitter transmits the reservation acceptance signal and the control device second transmitter starts transmitting the response request signal, wherein, when the mobile device first receiver receives the reservation acceptance signal, the mobile device memory stores information indicating that the reservation is accepted and authorized, and the notification unit notifies the user of the authorization, wherein, when the mobile device second receiver receives the response request signal after the control device second transmitter starts transmitting the response request signal, the mobile device transmitter transmits the response signal including the information indicating authorization, and wherein, when the control device receiver receives the response signal including the information indicating authorization in response to the response request signal, the controller performs at least one of unlocking or opening the door.

2. The door control system according to claim 1, wherein the control device second transmitter stops transmitting the response request signal when a predetermined period elapses after starting transmission of the response request signal.

3. The door control system according to claim 1,
wherein the control device further includes a control device memory that stores an identification number of the mobile device,
wherein the mobile device transmitter transmits the reservation signal and the response signal each including the identification number of the mobile device,
wherein, when the control device receiver receives the reservation signal including the identification number, the control device memory stores the identification number, and
wherein, when the control device receiver receives the response signal including the information indicating authorization in response to the response request signal, the controller collates the identification number included in the response signal with the identification number stored in the control device memory, and performs at least one of unlocking or opening the door only when the identification numbers match each other.

4. The door control system according to claim 3,
wherein, when the control device first transmitter transmits the reservation acceptance signal, the control device memory stores information indicating that the reservation is accepted and authorized,
wherein, when the control device receiver receives the response signal including the information indicating authorization in response to the response request signal, the controller inspects whether or not the control device memory stores the information indicating authorization, and performs at least one of unlocking or opening the door only when the information indicating authorization is stored, and
wherein, when at least one of unlocking or opening the door is performed, the control device memory deletes the information indicating authorization.

5. A mobile device configured to return a response signal to a response request signal for request of a response, transmitted from a control device provided at a vehicle, regarding control of at least one of unlocking or opening a door of the vehicle,
the mobile device configured to transmit in accordance with operation by a user, to the control device, a reservation signal for reservation of at least one of unlocking or opening the door, and receive, from the control device, a reservation acceptance signal indicating acceptance of the reservation signal,
the mobile device comprising:
an operation unit configured to accept operation of the user making reservation of at least one of unlocking or opening the door;
a mobile device transmitter configured to transmit the response signal, and the reservation signal when the operation unit is operated;
a mobile device first receiver configured to receive the reservation acceptance signal from the control device;
the mobile device second receiver configured to receive the response request signal from the control device;
the mobile device memory that stores information received by the mobile device first receiver; and
a notification unit configured to notify the user;
wherein, when the mobile device first receiver receives the reservation acceptance signal transmitted from the control device in response to the reservation signal, the mobile device memory stores information indicating that the reservation is accepted and authorized and the notification unit notifies the user of the authorization, and
wherein, when the mobile device second receiver receives the response request signal started transmitted by the control device in response to the reservation signal, the mobile device transmitter transmits the response signal including the information indicating authorization to cause the control device to control at least one of unlocking or opening the door.

6. A control device provided at a vehicle and configured to transmit a response request signal for request of a response regarding at least one of unlocking or opening a door of the vehicle, receive a response signal returned from a mobile device in response to the response request signal, and control at least one of unlocking or opening the door,
the control device configured to transmit, to the mobile device having transmitted a reservation signal for reservation of at least one of unlocking or opening the door in accordance with operation of a user, a reservation acceptance signal indicating acceptance of the reservation signal,
the control device comprising:
a control device receiver configured to receive the reservation signal and the response signal from the mobile device;
a control device first transmitter configured to transmit the reservation acceptance signal to the mobile device when the control device receiver receives the reservation signal from the mobile device;
a control device second transmitter configured to start transmitting the response request signal when the control device receiver receives the reservation signal from the mobile device; and
a controller configured to control at least one of unlocking or opening the door;
wherein, when the control device receiver receives the reservation signal, the control device first transmitter transmits the reservation acceptance signal and the control device second transmitter starts transmitting the response request signal, and
wherein, when the control device receiver receives the response signal including information indicating that the reservation is accepted and authorized, transmitted from the mobile device having received the reservation acceptance signal after the control device second transmitter starts transmitting the response request signal, the controller performs at least one of unlocking or opening the door.

* * * * *